Figure 2:
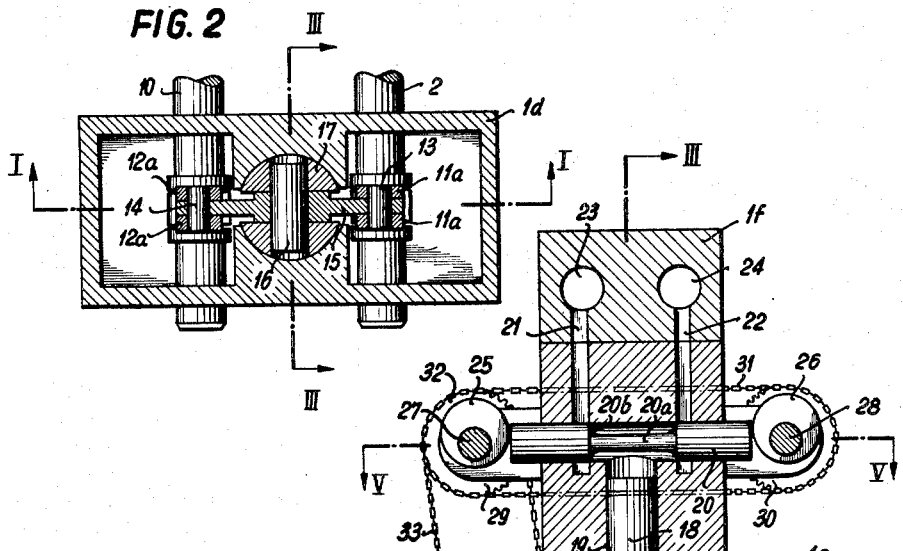

Sept. 17, 1957    E. WOYDT    2,806,431
LIQUID PISTON ENGINE OR LIQUID PISTON PUMP
Filed Feb. 10, 1956    3 Sheets-Sheet 1

INVENTOR
E. Woydt
ATTYS.

Sept. 17, 1957      E. WOYDT      2,806,431
LIQUID PISTON ENGINE OR LIQUID PISTON PUMP
Filed Feb. 10, 1956      3 Sheets-Sheet 2

INVENTOR
E. Woydt
ATTYS.

Sept. 17, 1957  E. WOYDT  2,806,431
LIQUID PISTON ENGINE OR LIQUID PISTON PUMP
Filed Feb. 10, 1956  3 Sheets-Sheet 3

INVENTOR
E. Woydt

United States Patent Office 2,806,431
Patented Sept. 17, 1957

2,806,431

LIQUID PISTON ENGINE OR LIQUID PISTON PUMP

Eduard Woydt, Stuttgart, Germany

Application February 10, 1956, Serial No. 564,813

Claims priority, application Germany March 1, 1955

3 Claims. (Cl. 103—38)

This invention has for its object so to construct piston engines or piston pumps that the stroke can be continuously turned without too great constructed expenditure, also that the engine is suitable for high pressures, that the engine is also suitable for high speeds of revolution and finally that the engine is simple to manufacture and will operate reliably.

For realising the object aimed at the invention makes use of a liquid piston engine or a liquid piston pump, the piston of which can be driven through a rockable double lever mounted on it by two driving shafts, the angle of which with respect to one another is adjustable. Known engines of this kind are fitted with simple non-return valves which require no special control. These known engines have the disadvantage, however, that they cannot rotate at high speeds of revolution.

The invention thus relates to liquid piston engines or liquid piston pumps, the piston of which is capable of being driven through a rockable double lever mounted on it by two driving shafts, the angle of which with respect to one another is adjustable.

The invention consists in this that inlet and outlet of the cylinder, in which the piston moves, are controlled by a slide valve, the control shaft of which is turned during the turning of the two driving shafts relatively to one another positively by half the amount, by which the two driving shafts turn with respect to one another. Whilst in the case of engines or pumps, the piston of which is adapted to be driven in some other manner, for instance through an ordinary crank drive by a single driving shaft, it is known to control the inlet and outlet of the cylinder by a slide valve, such a control of inlet and outlet of the cylinder by means of a slide valve cannot be adopted in a simple manner in the case of engines or pumps, the piston of which can be driven through a rockable double lever mounted on it by two driving shafts capable of angular displacement with respect to one another. This involves the difficulty, that the control drive may not be adjusted either in dependence on one of the driving shafts nor in dependence on the other driving shaft, if it is to function properly. The invention overcomes this difficulty by the expedient, that the control shaft of the slide valve is turned during the relative rotation of the two driving shafts positively by half the amount of the rotation.

Constructionally the invention makes use of a controlling differential gear, namely in such a manner that each driving shaft drives one of the members of a controlling differential gear, the third member of which, rotates at the mean speed of revolution of the two driving shafts, drives the control shaft of the slide valve.

The invention has the further object of providing a specially advantageous construction of the controlling differential gear.

Figure 1:
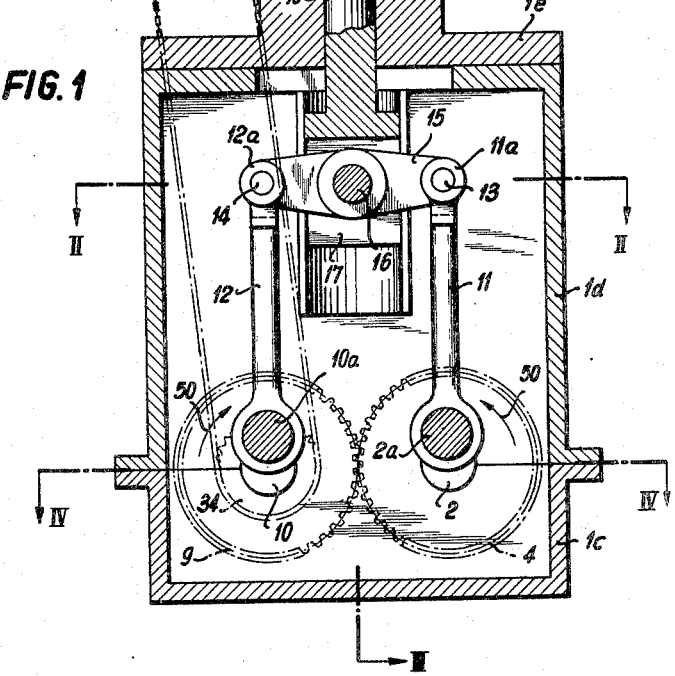
Figure 3:
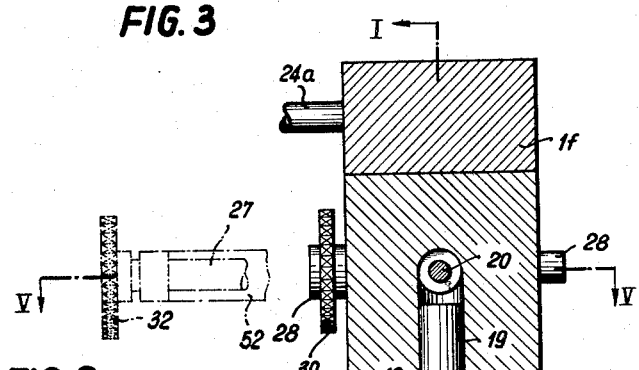
Figure 4:
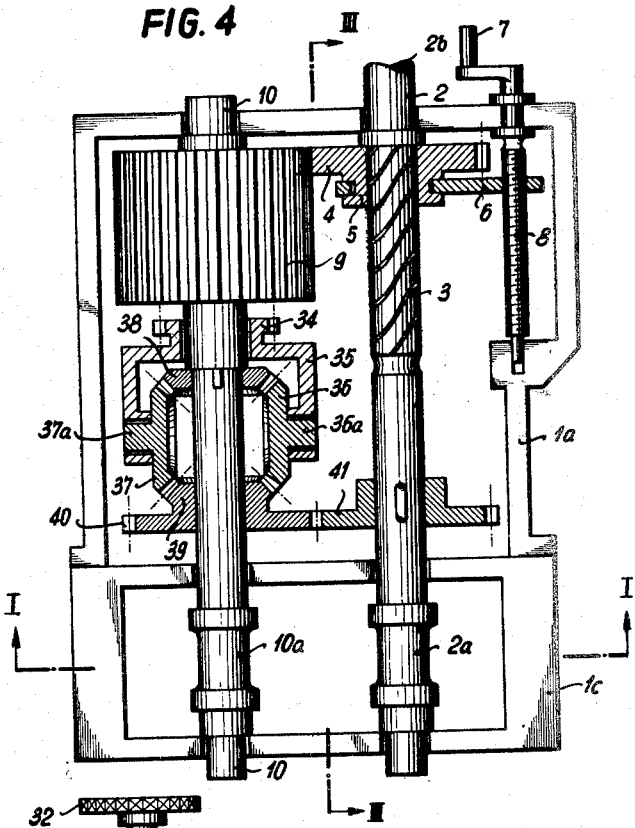
Figure 5:
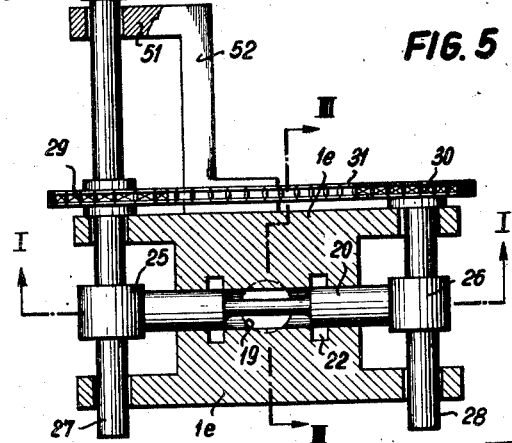

A constructional example of the invention is illustrated in the accompanying drawings, in which:

Figure 1 shows a vertical section through a pump according to the invention on the lines I—I of Figures 2, 3, 4 and 5;

Figure 2 a section on the lines II—II of Figures 1 and 3;

Figure 3 a vertical section on the lines III—III of Figures 1, 2, 4 and 5;

Figure 4 a horizontal section on the lines IV—IV of Figures 1 and 3;

Figure 5 a horizontal section on lines V—V of Figures 1 and 3; and

Figure 6:
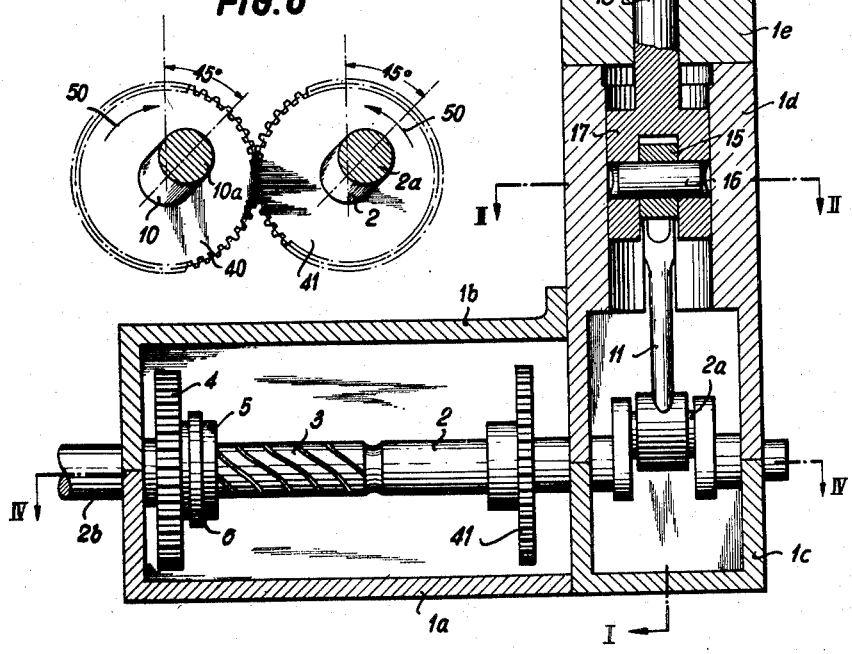

Figure 6 a diagrammatic representation of the crank of the two driving shafts in a position, in which they are turned by 90° with respect to one another.

In a casing consisting of the parts 1a, 1b, 1c and 1d a pump driving shaft 2 is supported, the end 2b of which can be driven in any suitable manner by an engine or the like (not shown). The shaft 2 is provided over a portion of its length with helical grooves 3 (Figures 3 and 4) along which a gear wheel 4 is longitudinally displaceable with a simultaneous rotary motion. For its longitudinal displacement there is provided a collar 5 which is fixed on it and in which a control fork 6 engages, which by turning a control spindle 8 provided with a hand operated crank 7 can be displaced to and fro in the direction of the longitudinal axis of the shaft 2. The control spindle 8 is supported between the parts 1a and 1b of the casing. The gear wheel 4 is permanently in mesh with a broader gear wheel 9, which is keyed on a second driving shaft, namely the parallel shaft 10. The shaft 2 and the parallel shaft 10, which thus always rotate in opposite directions, each carry a crank with a crank pin 2a and 10a respectively, to which connecting rods 11 and 12 respectively are linked. The connecting rods engage with upper forked ends 11a and 12a respectively with pins 13 and 14 mounted on a rocking lever 15 with arms of equal length, which is adapted to rock about a pin 16. The pin 16 is supported in the forked end 17 of the working piston 18 which slides in the working cylinder 19 which is in the part 1e of the casing. The forked end 17 is guided in the part 1d of the casing for performing an upward and downward motion. Figure 1 shows the position of the shafts 2 and 10 and their crank pins 2a and 10a, in which the greatest stroke of the piston 18 is produced. When, however, the two crank pins 2a and 10a occupy a relative position such as that shown in Figure 6, a smaller stroke of the piston 18 will result. Should the angle shown in Figure 6 as 45° be increased to 90°, the stroke of the piston would, on the shafts 2 and 10 turning, become equal to zero. The two-armed lever 15 will then only swing the pin 16, without any resultant motion of the pin and the piston 18. The arrows 50 in Figures 1 and 6 show the direction of rotation of the shafts 2 and 10.

For the control of the piston 18 or the cylinder 19 there is a slide valve (sliding piston) 20 with a reduced or neck part 20a.

The slide valve piston 20 is slidable in a horizontal bore 20b. The bore 20b is open towards the cylinder bore 19 and is also in communication through bores 21 and 22 with the inflow and outflow ducts 23, 24 which are in the part 1f of the casing and to which may be connected pipes 24a as indicated in Figure 3. The slide valve piston 20 thus connects during the to and fro motion the cylinder 19 alternately with the inflow and outflow ducts 23 and 24. A to and fro motion is effected by two eccentrics 25 and 26. These are mounted on eccentric shafts 27 and 28, which are supported in the part 1e of the casing. The axes of the eccentric shafts 27 and 28 are perpendicular to the axis of the slide valve 20. During synchronous rotation of the control shafts 27 and 28 and their eccentrics 25 and 26 the slide valve piston 20 will be moved to and fro.

On the shaft 27 is mounted a sprocket wheel 29 and on the shaft 28 a sprocket wheel 30. These two sprocket wheels 29 and 30 are connected with one another by a chain 31, so that they always run at the same speed. The shaft 27 is extended and is supported in a further bearing 51 which is carried by a bracket fixed to the casing 1e. On the other end of the shaft 27 is a second sprocket wheel 32, over which another chain 33 runs, which also runs over a sprocket wheel 34 which rotates loosely on the shaft 10. The sprocket wheel 34 is made in one piece with the casing 35 which forms a bearing cage for the pins 36a, 37a of two bevel wheels 36 and 37. The pair of bevel wheels 36, 37 therefore revolves round the shaft 10, when the casing 35 with the sprocket wheel 34 turns. The bevel wheels 36, 37 are permanently in mesh with a gear wheel 38 which is fixed on the shaft 10 and with a gear wheel 39 which is made in one piece with a spur wheel 40. The double gear wheel 39, 40 is rotatable on the shaft 10. The spur wheel 40 is permanently in mesh with a spur wheel 41 fixed to the shaft 2. The whole of the gearing 34 to 41 thus represents a differential gear, one member 41 of which is fixed on the shaft 2, whilst the second member 38 is fixed on the parallel shaft 10. An angular displacement of the shaft 10 with respect to the shaft 2 will produce an angular displacement of the sprocket wheel 34 of half the magnitude with respect to the parallel shaft 10 and with respect to the shaft 2. By this means the correct setting of the control piston 20 to the working piston 18 is ensured.

Modifications of the illustrated constructional example are of course possible. For instance, in place of two shafts 2, 10 lying parallel to one another with two cranks 2a, 10a lying next to one another shafts may be used, which lie one in the other and axially to one another, in which case the crank arms may be changed for eccentrics. When eccentrics and coaxial and parallel shafts are used, it is possible to link up with the same control device a plurality of pistons 18 arranged in a circle, thus forming a radial arrangement of the cylinders.

What I claim is:

1. A liquid motor or liquid pump comprising a cylinder, a piston slidable in the cylinder, a suction conduit, a pressure conduit, means for opening and closing the said conduits to place the same in and out of communication with the cylinder, a pin secured to the piston, a double lever swingable about the pin, two connecting rods, means pivoting one end of each rod to one end of the double lever, two shafts arranged in parallel relationship, a crank pin connecting the other end of each rod to said shafts, means operatively connected to one of the shafts to rotate the same, an adjustable drive operatively connecting the other shaft with the shaft adapted to be driven, means to operate the adjustable drive at will, said means for opening and closing the suction and pressure conduits including a control cylinder connecting the cylinder with the said conduits, a control slide movable in the control cylinder, the slide having a head cooperable with each of said conduits and means rigidly connecting the heads together, a control shaft for moving said control slide, and a control differential drive for said opening and closing means, one element of the control differential drive being operatively connected to the shaft adapted to be driven, a second element of the said drive being operatively connected to said other shaft, and a third element of the drive being coupled to the control shaft for the control slide.

2. An assemblage as defined in claim 1 wherein said control differential drive includes a gear on said driven shaft, a loosely mounted gear on said other shaft in mesh therewith, a bevel gear fixed to the loosely mounted gear, a second bevel gear fixed on said other shaft in spaced relationship to the first named bevel gear, a pair of rotating bevel gears arranged between and meshing with the bevel gears on the other shaft, a bearing cage for said pair of rotating bevel gears and means connecting the bearing cage with the control shaft to rotate the same, the cage constituting the third element of the drive.

3. An assemblage as defined in claim 2 wherein an eccentric on the control shaft bears against one head of the control slide, a second control shaft, an eccentric on the second control shaft bearing against the other head of the control slide and means operatively connecting the control shafts to rotate in synchronism.

References Cited in the file of this patent

UNITED STATES PATENTS

| | | |
|---|---|---|
| 1,682,570 | Holveck | Aug. 28, 1928 |
| 2,001,336 | Vago et al. | May 14, 1935 |